United States Patent
Li (10) Patent No.: US 11,752,904 B2
(45) Date of Patent: Sep. 12, 2023

(54) SEAT FASTENING DEVICE AND CHILD SAFETY SEAT THEREWITH

(71) Applicant: Bambino Prezioso Switzerland AG, Steinhausen (CH)

(72) Inventor: Ruyi Li, Guangdong (CN)

(73) Assignee: Bambino Prezioso Switzerland AG, Steinhausen (CH)

( * ) Notice: Subject to any disclaimer, the term of this patent is extended or adjusted under 35 U.S.C. 154(b) by 56 days.

(21) Appl. No.: 17/342,466

(22) Filed: Jun. 8, 2021

(65) Prior Publication Data

US 2021/0394653 A1 Dec. 23, 2021

(30) Foreign Application Priority Data

Jun. 19, 2020 (CN) .......................... 202010571737.4

(51) Int. Cl.
*B60N 2/28* (2006.01)

(52) U.S. Cl.
CPC ......... *B60N 2/2869* (2013.01); *B60N 2/2806* (2013.01); *B60N 2/2821* (2013.01); *B60N 2002/2818* (2013.01)

(58) Field of Classification Search
CPC .... B60N 2/2869; B60N 2/2821; B60N 2/286; B60N 2/2863; B60N 2/2806
See application file for complete search history.

(56) References Cited

U.S. PATENT DOCUMENTS

| | | | | |
|---|---|---|---|---|
| 7,029,069 B2* | 4/2006 | Hendren | ............... | B60N 2/2869 297/256.12 |
| 8,967,715 B2* | 3/2015 | Carpenter | ............ | B60N 2/2866 297/253 |
| 2001/0004162 A1* | 6/2001 | Yamazaki | ............ | B60N 2/2821 248/349.1 |
| 2002/0043836 A1* | 4/2002 | Maciejczyk | ......... | B60N 2/2869 297/250.1 |
| 2013/0001992 A1* | 1/2013 | Hartenstine | .......... | B60N 2/2866 297/250.1 |

(Continued)

FOREIGN PATENT DOCUMENTS

| | | |
|---|---|---|
| CN | 1382602 A | 12/2002 |
| CN | 203110970 U | 8/2013 |

(Continued)

*Primary Examiner* — David R Dunn
*Assistant Examiner* — Tania Abraham
(74) *Attorney, Agent, or Firm* — Winston Hsu (57) ABSTRACT

A seat fastening device is adapted to a child safety seat. The child safety seat includes a base and a seat body pivoted to the base via a pivotal shaft, so that the seat body can switch between a forward-facing orientation and a rearward-facing orientation by rotating around the pivotal shaft. The seat fastening device includes a locking component, a locked component assembled with one of the seat body and the base, and a tightening and loosening mechanism assembled with the other of the seat body and the base and connected to the locking component. The tightening and loosening mechanism is configured to loosen or tighten the locking component as the seat body is rotated to the forward-facing orientation or the rearward-facing orientation, so as to lock the locking component with the locked component, which achieves firm connection of the base and the seat body and convenient and rapid operation.

12 Claims, 7 Drawing Sheets

(56) References Cited

U.S. PATENT DOCUMENTS

| | | | | |
|---|---|---|---|---|
| 2014/0070581 A1* | 3/2014 | Rabeony | ............ | B60N 2/2869 |
| | | | | 297/256.16 |
| 2015/0183341 A1 | 7/2015 | Carpenter | | |
| 2015/0336481 A1* | 11/2015 | Horsfall | .............. | B60N 2/2863 |
| | | | | 297/256.16 |
| 2017/0144624 A1 | 5/2017 | Geist | | |
| 2017/0355287 A1* | 12/2017 | Anderson | ............ | B60N 2/2872 |

FOREIGN PATENT DOCUMENTS

| | | |
|---|---|---|
| CN | 109455121 A | 3/2019 |
| DE | 10 2006 034 557 A1 | 8/2007 |
| GB | 2 207 043 A | 1/1989 |
| WO | 2013/082321 A1 | 6/2013 |

* cited by examiner

SEAT FASTENING DEVICE AND CHILD SAFETY SEAT THEREWITH

BACKGROUND OF THE INVENTION

1. Field of the Invention

The present invention relates to a seat fastening device and a child safety seat therewith, and more particularly, to a seat fastening device and a child safety seat with firm connection of a base and a seat body and convenient and rapid operation.

2. Description of the Prior Art

With continuous development of the economy and continuous advancement of science and technology, a car safety seat is one of many consumer products and specially designed for children of different weights or ages. The car safety seat is installed in a car and can effectively improve the safety of children in the car. In the case of car collision or sudden deceleration, the impact on children can be reduced and the children's body movement can be restricted to reduce damage to the children by the car safety seat. The conventional car safety seat capable of switching between a forward-facing orientation and a rearward-facing orientation usually includes a base, a seat body which can be used forwardly or backwardly on the base, and a fastening mechanism for fastening the seat body and the base in either forward-facing orientation or rearward-facing orientation. However, the existing fastening mechanism generally has the disadvantages of inconvenient operation and weak connection. Therefore, there is a need to develop a child safety seat and a seat fastening device thereof to overcome the above-mentioned disadvantages.

SUMMARY OF THE INVENTION

Therefore, an objective of the present invention is to provide a seat fastening device and a child safety seat with firm connection of a base and a seat body and convenient and rapid operation, for solving the aforementioned problems.

In order to achieve the aforementioned objective, the present invention discloses a seat fastening device adapted to a child safety seat. The child safety seat includes a base and a seat body pivoted to the base via a pivotal shaft, so that the seat body can be switched between a forward-facing orientation and a rearward-facing orientation by rotating around the pivotal shaft. The seat fastening device includes at least one locking component, a locked component assembled with one of the seat body and the base, and a tightening and loosening mechanism assembled with the other of the seat body and the base and connected to the at least one locking component. The tightening and loosening mechanism is configured to loosen or tighten the at least one locking component as the seat body is rotated to the forward-facing orientation or the rearward-facing orientation, so as to lock the at least one locking component with the locked component.

Preferably, the tightening and loosening mechanism is disposed inside the other of the seat body and the base, and the at least one locking component is exposed outside the other of the seat body and the base where the tightening and loosening mechanism is disposed inside.

Preferably, the tightening and loosening mechanism includes at least one tightening and loosening component and a retractor for retracting the at least one tightening and loosening component, and a free end of the at least one tightening and loosening component is connected to the at least one locking component.

Preferably, the seat fastening device further includes an operating component and a driving component for driving the retractor, the driving component and the operating component are installed on the other of the seat body and the base where the tightening and loosening mechanism is disposed inside, and the driving component is linked with the operating component.

Preferably, the operating component is installed on at least one lateral surface of the other of the seat body and the base where the tightening and loosening mechanism is disposed inside, and the driving component is disposed inside the other of the seat body and the base where the tightening and loosening mechanism is disposed inside.

Preferably, the operating component is located on two lateral surfaces of the other of the seat body and the base where the tightening and loosening mechanism is disposed inside.

Preferably, the seat fastening device further includes a drawing component, one end of the drawing component is connected to the operating component, and another end of the drawing component is connected to the driving component.

Preferably, the drawing component is a steel wire.

Preferably, the at least one tightening and loosening component is a tape.

Preferably, the at least one locking component is located on a front side or/and a back side of the other of the seat body and the base where the tightening and loosening mechanism is disposed inside, and the locked component is located on a front side or/and a back side of the seat body or the base.

Preferably, the at least one tightening and loosening component includes a front tightening and loosening component and a rear tightening and loosening component, the at least one locking component includes two locking components, an end of the front tightening and loosening component and an end of the rear tightening and loosening component are connected to the retractor, another end of the front tightening and loosening component extends towards the locking component at a front side to form a front free end connected to the locking component at the front side, and another end of the rear tightening and loosening component extends towards the locking component at a back side to form a rear free end connected to the locking component at the back side.

Preferably, a forward-facing installation hole and a rearward-facing installation hole are formed on the other of the seat body and the base where the tightening and loosening mechanism is disposed inside, one end of the at least one tightening and loosening component is connected to the retractor, another end of the at least one tightening and loosening component forms a free end, the least one locking component passes through the forward-facing installation hole to lock with the locked component as the seat body is rotated to the forward-facing orientation, and the least one locking component passes through the rearward-facing installation hole to lock with the locked component as the seat body is rotated to the rearward-facing orientation.

Preferably, one of the at least one locking component and the locked component is a hook, and the other of the at least one locking component and the locked component is a rod.

In order to achieve the aforementioned objective, the present invention further discloses a child safety seat including a base, a seat body pivoted to the base via a pivotal shaft, so as to switch the seat body between a forward-facing orientation and a rearward-facing orientation by rotating around the pivotal shaft, and a seat fastening device. The seat fastening device includes at least one locking component, a locked component assembled with one of the seat body and the base, and a tightening and loosening mechanism assembled with the other of the seat body and the base and connected to the at least one locking component. The tightening and loosening mechanism is configured to loosen or tighten the at least one locking component as the seat body is rotated to the forward-facing orientation or the rearward-facing orientation, so as to lock the at least one locking component with the locked component.

Preferably, the child safety seat further includes a door-shaped bracket upwardly protruding from a rear end of the base, and the locked component is disposed in an enclosed space enclosed by the door-shaped bracket and the base.

Preferably, a safety belt passage is formed on the base for allowing a safety belt to pass through so as to restrain the base.

Preferably, the safety belt passage is a groove structure formed on a rear top portion of the base.

Preferably, the safety belt passage stretches across the base.

In summary, the seat fastening device of the present application includes the locking component, the locked component and the tightening and loosening mechanism configured to loosen or tighten the locking component. The locked component is installed on one of the seat body and the base, and the tightening and loosening mechanism installed on the other of the seat body and the base and connected to the locking component. The tightening and loosening mechanism is configured to loosen or tighten the locking component as the seat body is rotated to the forward-facing orientation or the rearward-facing orientation, so as to lock the locking component with the locked component, which achieves firm connection of the base and the seat body and convenient and rapid operation.

These and other objectives of the present invention will no doubt become obvious to those of ordinary skill in the art after reading the following detailed description of the preferred embodiment that is illustrated in the various figures and drawings.

DETAILED DESCRIPTION

In order to illustrate technical specifications and structural features as well as achieved purposes and effects of the present invention, relevant embodiments and figures are described as follows.

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure (s) being described. The components of the present invention can be positioned in a number of different orientations. As such, the directional terminology is used for purposes of illustration and is in no way limiting. Accordingly, the drawings and descriptions will be regarded as illustrative in nature and not as restrictive.

Figure 1:
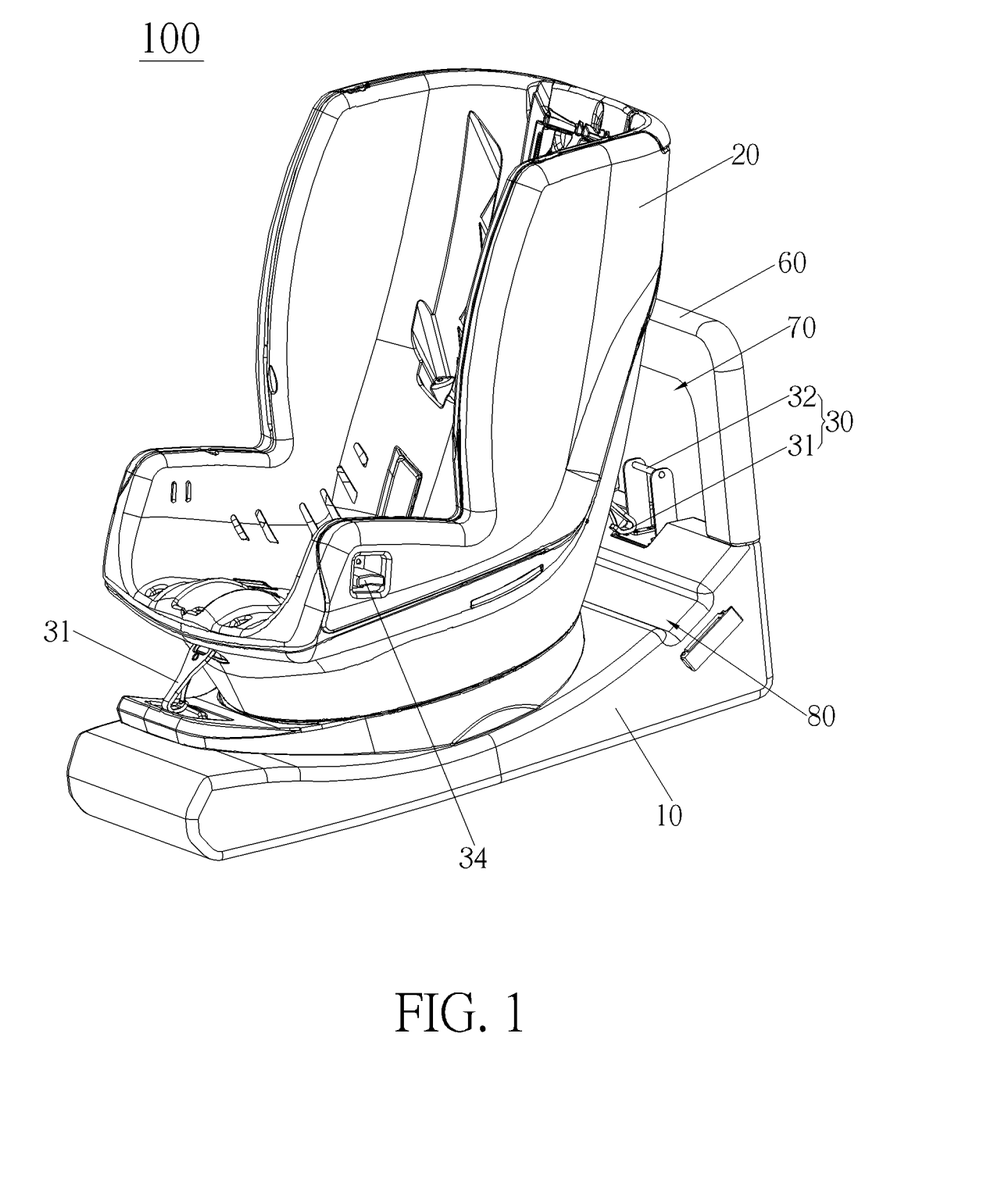
FIG. 1 is a schematic drawing of a child safety seat in a forward-facing orientation according to a first embodiment of the present application.
Figure 2:
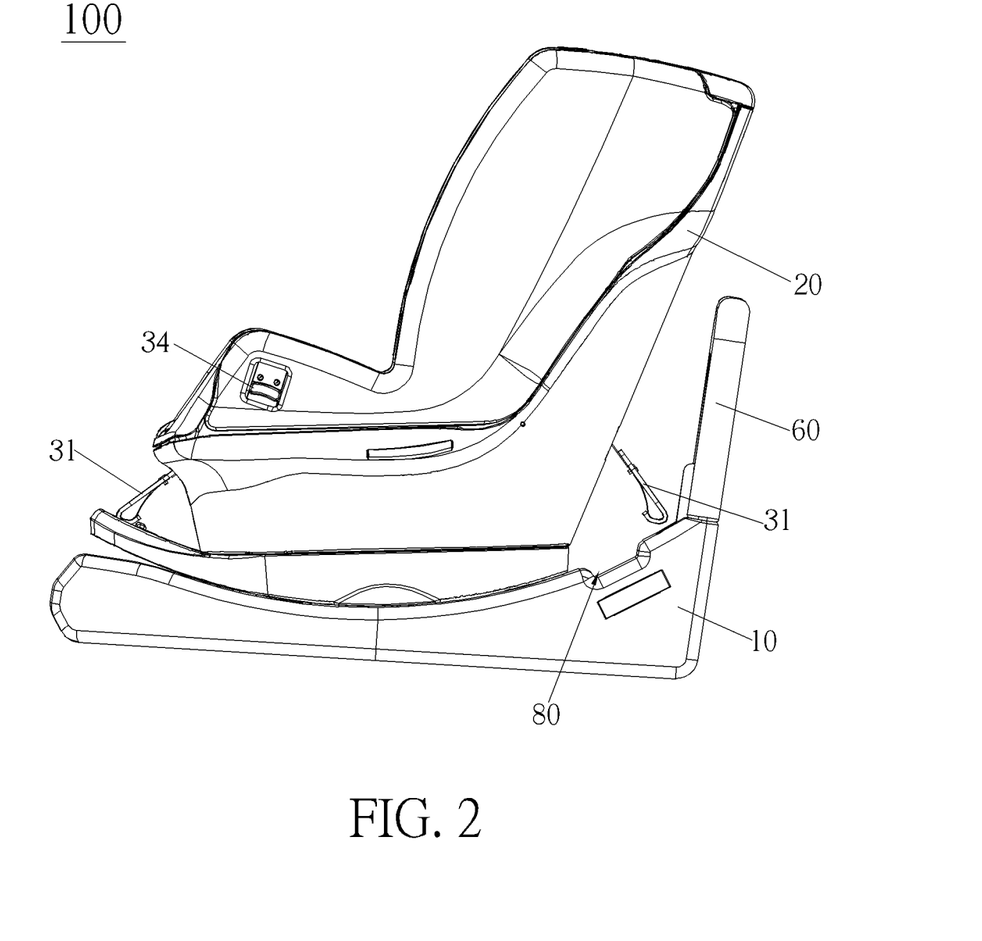
FIG. 2 is a lateral view of the child safety seat as shown in FIG. 1 according to the first embodiment of the present application.
Figure 3:
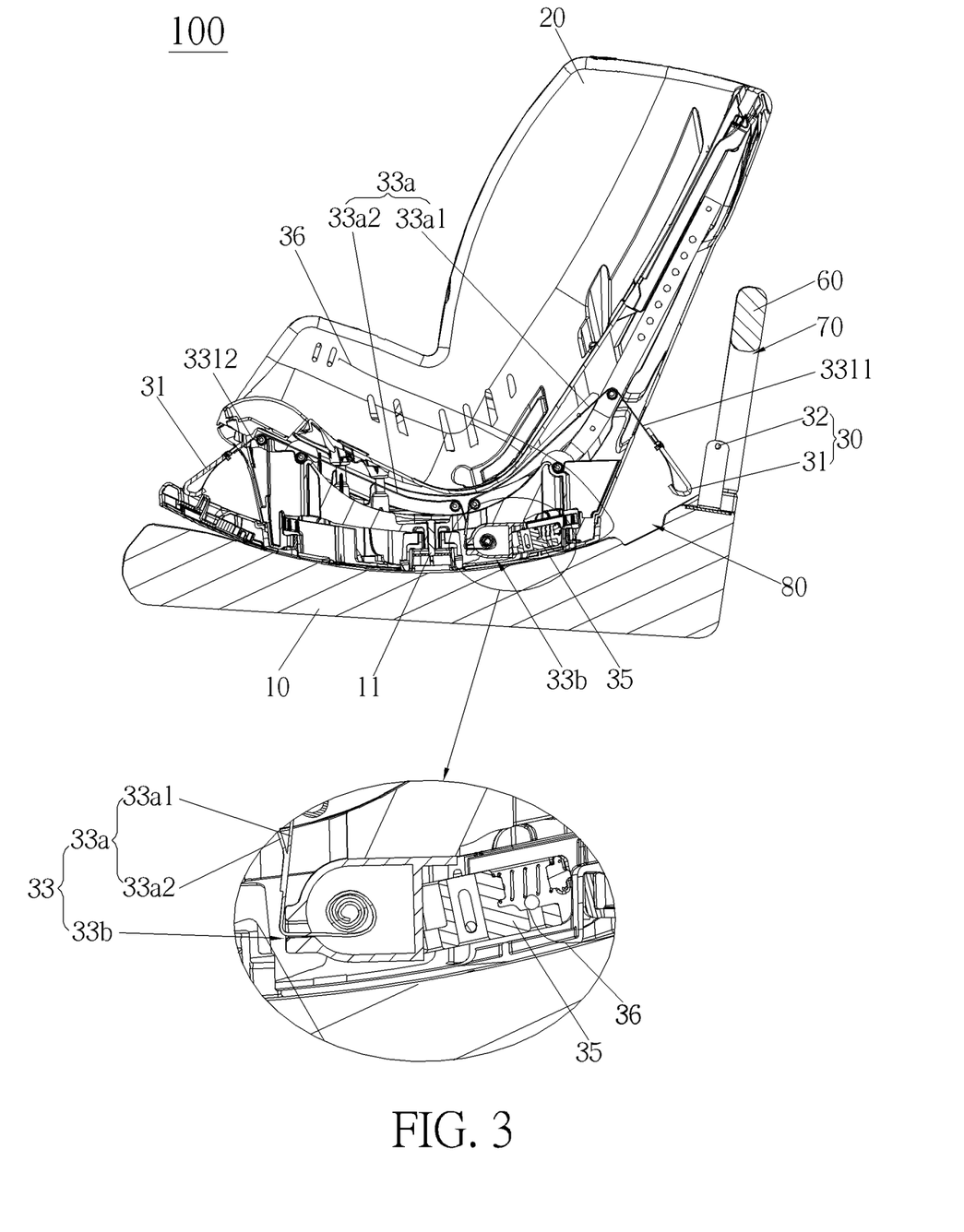
FIG. 3 is an internal structural diagram of the child safety seat as shown in FIG. 2 according to the first embodiment of the present application.
Figure 4:
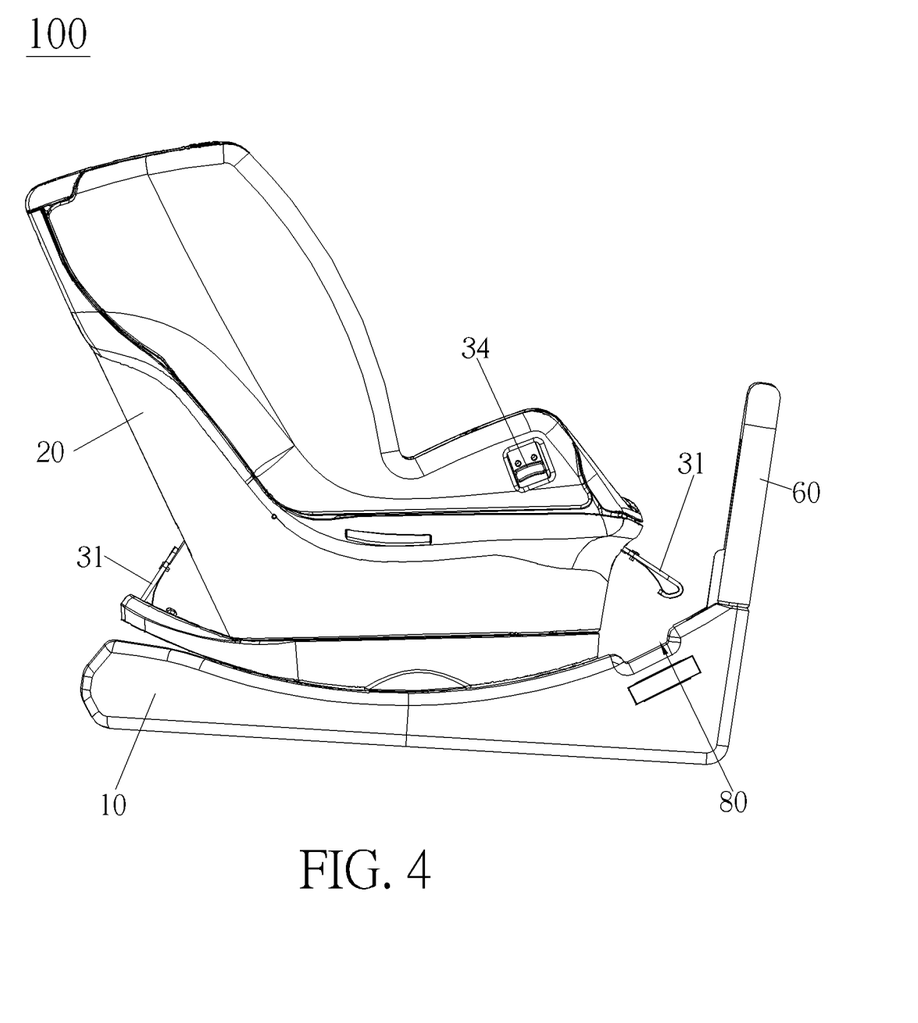
FIG. 4 is a schematic drawing of the child safety seat in a rearward-facing orientation according to the first embodiment of the present application.

Please refer to FIG. 1 to FIG. 4. FIG. 1 is a schematic drawing of a child safety seat 100 in a forward-facing orientation according to a first embodiment of the present application. FIG. 2 is a lateral view of the child safety seat 100 as shown in FIG. 1 according to the first embodiment of the present application. FIG. 3 is an internal structural diagram of the child safety seat 100 as shown in FIG. 2 according to the first embodiment of the present application. FIG. 4 is a schematic drawing of the child safety seat 100 in a rearward-facing orientation according to the first embodiment of the present application. The child safety seat includes a base 10, a seat body 20 and a seat fastening device 30. The seat body 20 is pivoted to the base 10 via a pivotal shaft 11, so as to switch the seat body 20 between the forward-facing orientation as shown in FIG. 1 to FIG. 3 and the rearward-facing orientation as shown in FIG. 4, by rotating around the pivotal shaft 11, wherein the forward-facing orientation means that a back of the seat body 20 faces the rear of the child safety seat 100, and the rearward-facing orientation means that the back of the seat body 20 faces the front of the child safety seat 100. A safety belt passage 80 is formed on the base 10 for allowing a safety belt to pass through so as to restrain the base 10. The safety belt passage 80 can fasten orientation of the safety belt on the base 10, so as to fasten the base 10 on a car seat more reliably. Preferably, the safety belt passage 80 can be a groove structure formed on a rear top portion of the base 10 and stretches across the base 10, so as to facilitate restraint operation of the safety belt on the base 10, but it is not limited thereto.

The seat fastening device 30 includes at least one locking component 31, a locked component 32, and a tightening and loosening mechanism 33 configured to loosen or tighten the locking component 31. The tightening and loosening mechanism 33 can be assembled with the seat body 20 and connected to the locking component 31, and the tightening and loosening mechanism 33 can loosen or tighten the locking component 31 to lock the locking component 31 with the locked component 32, as the seat body 20 is rotated to the forward-facing orientation or the rearward-facing orientation. During the locking procedure of the locking component 31 and the locked component 32, the tightening and loosening mechanism 33 can loosen the tightening of the locking component 31 first, so that the locking component 31 can move to the locked component 32 to be locked with the locked component 32. After the locking component 31 and the locked component 32 are locked with each other, the tightening and loosening mechanism 33 can automatically tighten the locking component 31. Specifically, the tightening and loosening mechanism 33 can be disposed inside the seat body 20, and the locking component 31 can be exposed outside the seat body 20 where the tightening and loosening mechanism 33 is disposed inside, which can make the appearance of the seat body 20 cleaner and can prevent external interference to the tightening and loosening mechanism 33. In addition, the tightening and loosening mechanism 33 also can be assembled on the base 10, and the locked component 32 can be assembled on the seat body 20 correspondingly, which also can achieve locking connection of the locking component 31 and the locked component 32 by tightening and loosening of the tightening and loosening mechanism 33. When the tightening and loosening mechanism 33 is assembled with the base 10, the tightening and loosening mechanism 33 can be disposed inside the base 10, and the locking component 31 can be exposed outside the base 10 correspondingly, but it is not limited thereto.

As shown in FIG. 3, the tightening and loosening mechanism 33 includes at least one flexible tightening and loosening component 33a and a retractor 33b for automatically retracting the tightening and loosening component 33a, and a free end of the tightening and loosening component 33a is connected to the locking component 31, so as to facilitate the locking component 31 to move to the locked component 32 by pulling the tightening and loosening component 33a. After the locking component 31 and the locked component 32 are locked with each other, the retractor 33b can retract the tightening and loosening component 33a to keep the locking component 31 in a tightened state, which facilitates locking operation of the locking component 31 and the locked component 32. Specially, the seat fastening device 30 includes two locking components 31 disposed on two sides of the seat body 20 where the tightening and loosening mechanism 33 is disposed inside, and the locked component 32 can be located on a back side of the base 10, so as to ensure that the locking component 31 can lock with the locked component 32 as the seat body 20 is located in the forward-facing orientation or the rearward-facing orientation. According to actual demands, the locked component 32 also can be located on a front side of the base 10, which also can ensure that the locking component 31 can lock with the locked component 32 as the seat body 20 is located in the forward-facing orientation or the rearward-facing orientation. The tightening and loosening component 33a can include a front tightening and loosening component 33a1 and a rear tightening and loosening component 33a2, an end of the front tightening and loosening component 33a1 and an end of the rear tightening and loosening component 33a2 are connected to the retractor 33b, another end of the front tightening and loosening component 33a1 extends towards the locking component 31 at a front side to form a front free end 3311 connected to the locking component 31 at the front side, and another end of the rear tightening and loosening component 33a2 extends towards the locking component 31 at a back side to form a rear free end 3312 connected to the locking component 31 at the back side. Therefore, the front tightening and loosening component 33a1 can be pulled out to lock or unlock the locking component 31 and the locked component 32 at the same side, and the rear tightening and loosening component 33a2 can be pulled out to lock or unlock the locking component 31 and the locked component 32 at the same side. For example, the tightening and loosening component 33a can be a tape, the locking component 31 can be a hook, and the locked component 32 can be a rod, so as to facilitate locking or unlocking operation of the locking component 31 and the locked component 32. According to actual demands, the locking component 31 also can be a rod, and the locked component 32 can be a hook correspondingly, which also facilitates locking or unlocking operation of the locking component 31 and the locked component 32. When the tightening and loosening mechanism 33 is assembled with the base 10 and the two locking components 31 are located at two sides of the base 10, the locked component 32 can be disposed on the front side or the back side of the seat body 20 correspondingly, and the tightening and loosening component 33a also can include the front tightening and loosening component 33a1 and the rear tightening and loosening component 33a2, which also can achieve purposes that the front tightening and loosening component 33a1 can be pulled out to lock or unlock the locking component 31 and the locked component 32 at the same side, and the rear tightening and loosening component 33a2 can be pulled out to lock or unlock the locking component 31 and the locked component 32 at the same side.

As shown in FIG. 1 to FIG. 4, for enhancing safety and easy locking and unlocking operation, the seat fastening device 30 further includes an operating component 34 and a driving component 35 for driving the retractor 33b. The driving component 35 and the operating component 34 can be installed on the seat body 20 where the tightening and loosening mechanism 33 is disposed inside, and the driving component 35 can be linked with the operating component 34, so that the driving component 35 can be driven by operating the operating component 34 to unlock the retractor 33b, thereby allowing the tightening and loosening component 33a to be pulled out by the locking component 31. When the locking component 31 and the locking component 32 are locked with each other, the operating component 34 can be released to recover the driving component 35. The recovered driving component 35 no longer drives the retractor 33b, so retractor 33b can retract the tightening and loosening component 33a to keep the locking component 31 in the tightened state, thereby ensuring the reliability of the locking connection between the locking component 31 and the locked component 32. In order to enhance the convenience of operation, the operating component 34 can be installed on at least one lateral surface of the seat body 20 where the tightening and loosening mechanism 33 is disposed inside, and the driving component 35 can be disposed inside the seat body 20 where the tightening and loosening mechanism 33 is disposed inside. Preferably, the operating component 34 can be located on two lateral surfaces of the seat body 20 where the tightening and loosening mechanism 33 is disposed inside, so as to provide different operating positions and make the operation more flexible. In order to enable the operating component 34 to remotely link with the driving component 35, the seat fastening device 30 further includes a flexible drawing component 36. One end of the drawing component 36 is connected to the operating component 34, and another end of the drawing component 36 is connected to the driving component 45. The drawing component 36 can be a steel wire, so as to simplify structure of the drawing component 36 and ensure reliability of the linkage of the operating component 34 and the driving component 35, but it is not limited thereto. In order to make the locking connection of the locking component 31 and the locked component 32 more reliable, the child safety seat 100 further includes a door-shaped bracket 60 upwardly protruding from a rear end of the base 10, and the locked component 32 is disposed in an enclosed space 70 enclosed by the door-shaped bracket 60 and the base 10, so that the door-shaped bracket 60 can provide protection to the locking component 31 and the locked component 32 in the locking connection to prevent external interference to them, but it is not limited to thereto. It is understandable that when the tightening and loosening mechanism 33 is installed on the base 10, the operating component 34, the driving component 35 and the drawing component 36 can be installed in the base 10.

Please refer to FIG. 1 to FIG. 4, the operational principle of the child safety seat 100 of the first embodiment is introduced as follows. When the seat body 20 rotates around the pivotal shaft 11 to the forward-facing orientation as shown in FIG. 1 to FIG. 3, the operating component 34 can be operated to pull the driving component 35 through the drawing component 36, so that the driving component 35 can drive the retractor 33b to release the tightening and loosening component 33a, thereby allowing the tightening and loosening component 33a to be pulled out by the locking component 31. Next, the locking component 31 can be moved to the locked component 32 to lock with the locked component 32. After the locking component 31 and the locked component 32 are locked with each other, the operating component 34 can be released for recovering the operating component 34, the drawing component 36 and the driving component 35. The recovered driving component 35 no longer drives the retractor 33b, so the retractor 33b can retract the tightening and loosening component 33a to keep the locking component 31 in the tightened stat, so that the locking component 31 and the locked component 32 are kept in a locked state. When the seat body 20 is to be rotated to the rearward-facing orientation, the operating component 34 can be operated until the retractor 33b releases the tightening and loosening component 33a. Then, the locking component 31 can be removed from the locked component 32, and the seat body 20 can be rotated around the pivotal shaft 11 to the rearward-facing orientation as shown in FIG. 4. At last, the other locking component 31 can be moved to the locked component 32 to lock with the locked component 32.

Figure 5:
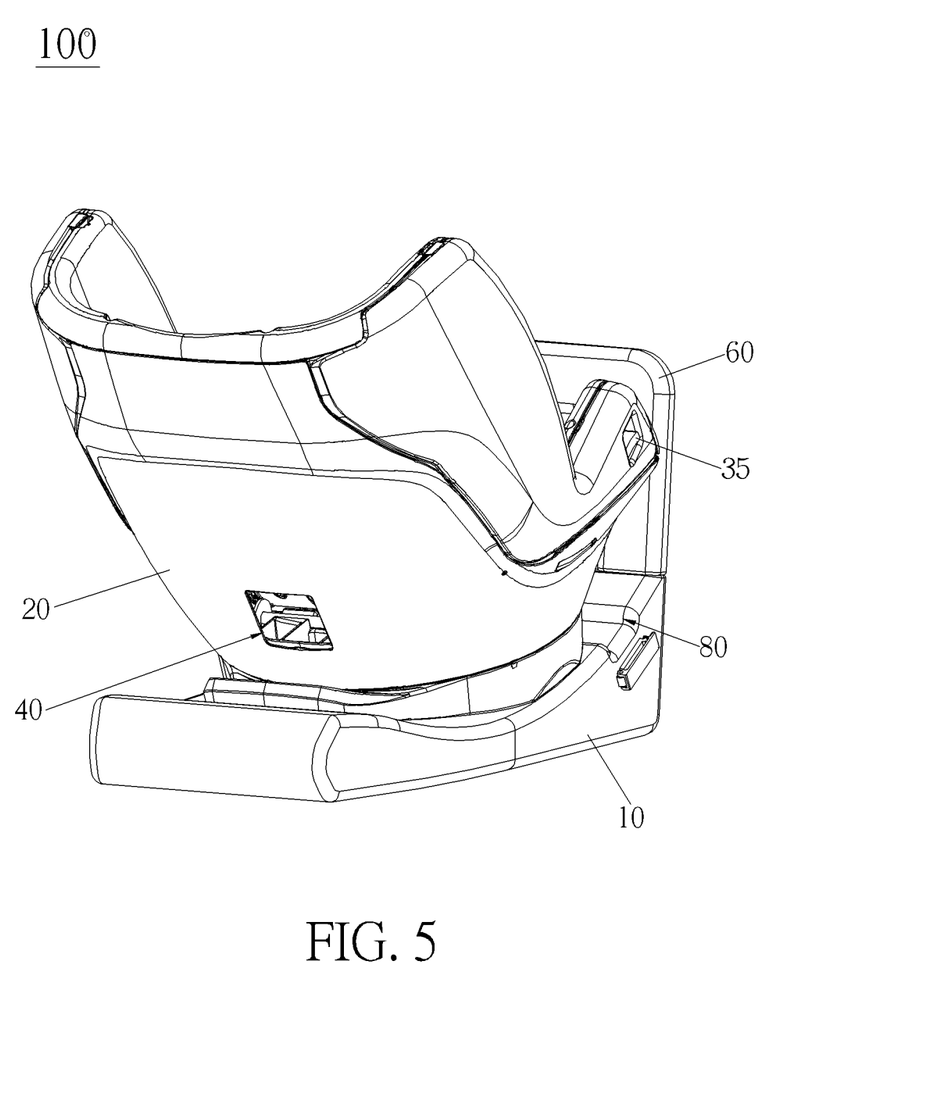
FIG. 5 is a schematic drawing of a child safety seat in a rearward-facing orientation according to a second embodiment of the present application.
Figure 6:
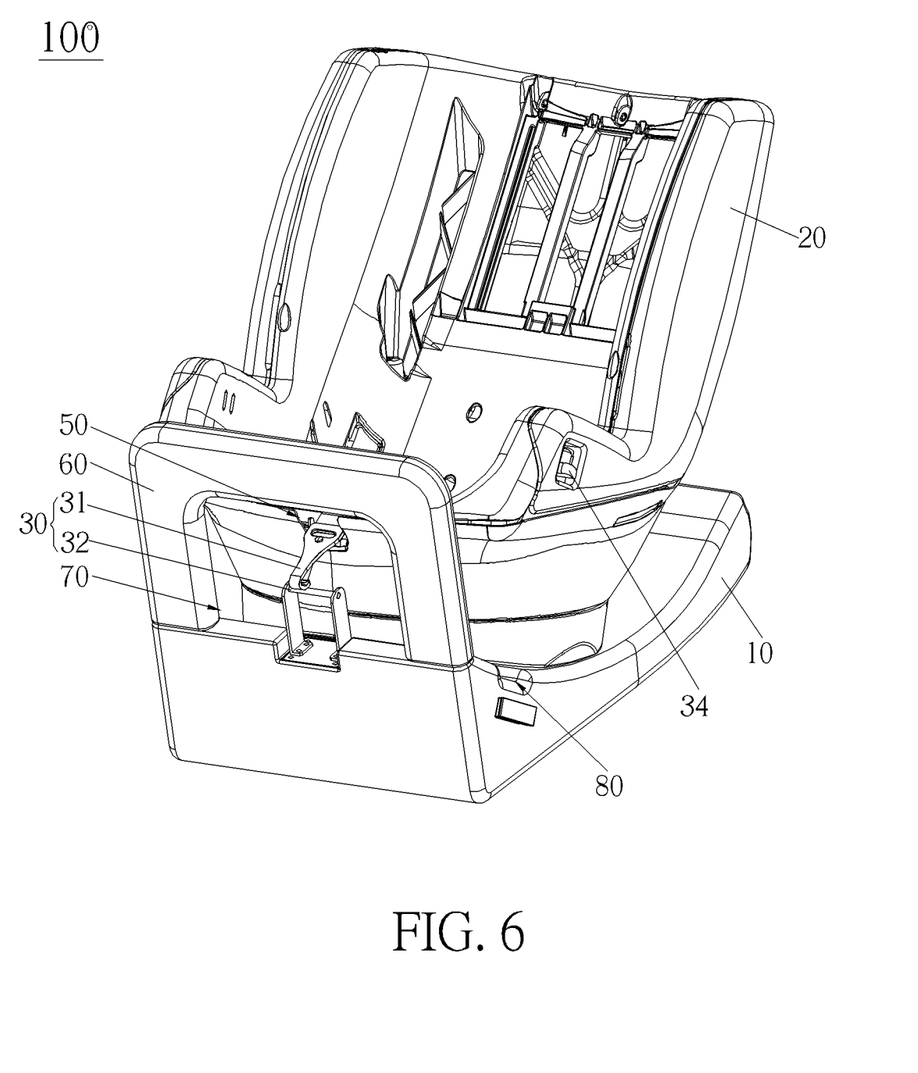
FIG. 6 is a diagram of the child safety seat as shown in FIG. 5 at another view according to the second embodiment of the present application.
Figure 7:
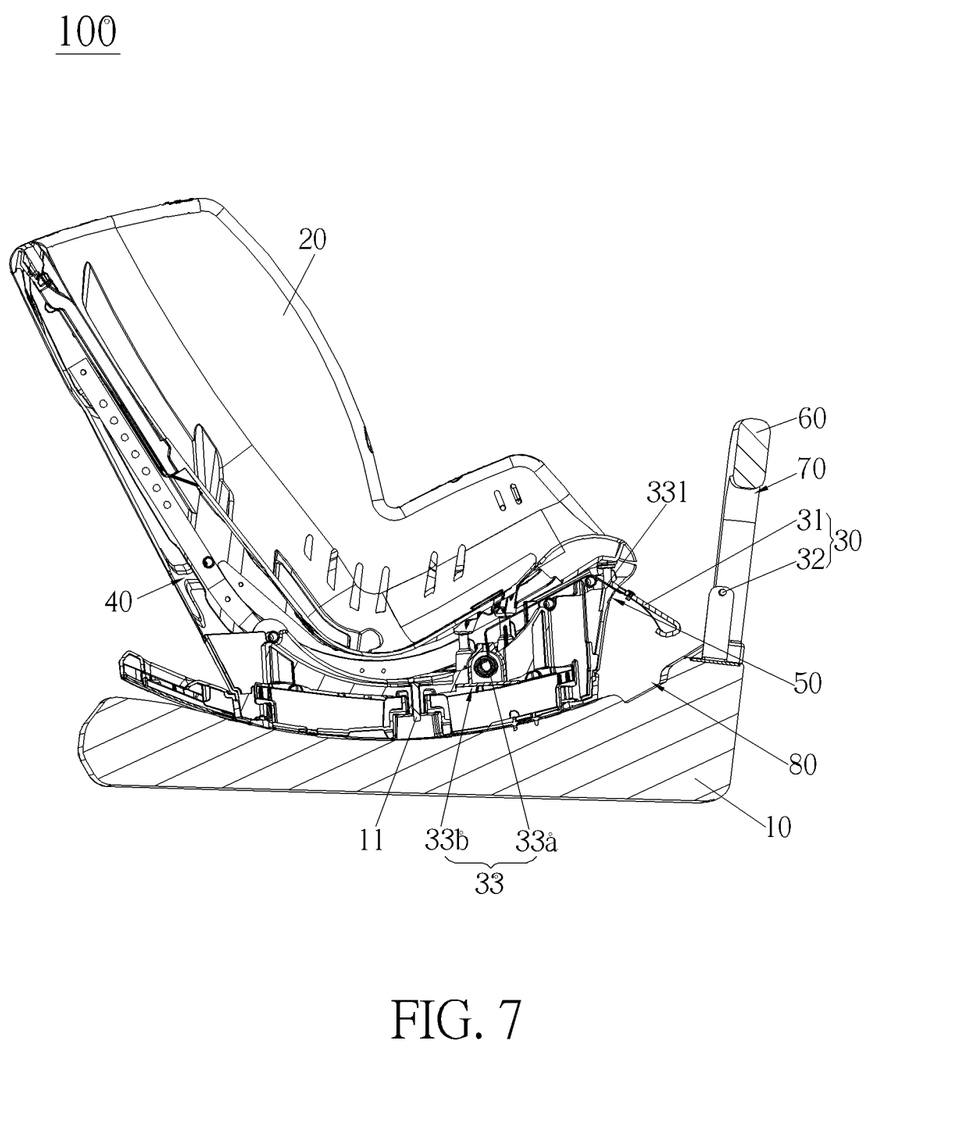
FIG. 7 is an internal structural diagram of the child safety seat as shown in FIG. 5 according to the second embodiment of the present application.

Please refer to FIG. 5 to FIG. 7. FIG. 5 is a schematic drawing of a child safety seat 100' in a rearward-facing orientation according to a second embodiment of the present application. FIG. 6 is a diagram of the child safety seat 100' as shown in FIG. 5 at another view according to the second embodiment of the present application. FIG. 7 is an internal structural diagram of the child safety seat 100' as shown in FIG. 5 according to the second embodiment of the present application. The structure of the child safety seat 100' of the second embodiment is similar to the structure of the child safety seat 100 of the first embodiment, and main differences between the embodiments are described as follows.

(1) In the second embodiment, a tightening and loosening mechanism 33' includes a tightening and loosening component 33a' and a retractor 33b', the tightening and loosening component 33a' does not include the front tightening and loosening component 33a1 and the rear tightening and loosening component 33a2, and there are no locking components 31 disposed on two sides of the seat body 20. In the first embodiment, the tightening and loosening component 33a includes the front tightening and loosening component 33a1 and the rear tightening and loosening component 33a2, and the two locking components 31 are disposed on the two sides of the seat body 20.

(2) In the second embodiment, since the tightening and loosening component 33a' does not include the front tightening and loosening component 33a1 and the rear tightening and loosening component 33a2, and there are no locking components 31 disposed on two sides of the seat body 20, a forward-facing installation hole 40 and a rearward-facing installation hole 50 are formed on the seat body 20 where the tightening and loosening mechanism 33' is disposed inside. One end of the tightening and loosening component 33a' is connected to the retractor 33b, another end of the tightening and loosening component 33a' forms a free end 331, the locking component 31 can pass through the forward-facing installation hole 40 to lock with the locked component 32 as the seat body 20 is rotated to the forward-facing orientation, and the locking component 31 can pass through the rearward-facing installation hole 50 to lock with the locked component 32 as the seat body 20 is rotated to the rearward-facing orientation as shown in FIG. 5 to FIG. 7. In the first embodiment, when the seat body 20 is rotated to the forward-facing orientation, the locking component 31 at one side can lock with the locked component 32 as shown in FIG. 1. When the seat body 20 is rotated to the rearward-facing orientation, the locking component 31 at the other side can lock with the locked component 32 as shown in FIG. 4.

Please refer to FIG. 5 to FIG. 7, the operational principle of the child safety seat 100' of the second embodiment is introduced as follows. Since the principle of releasing the tightening and loosening component 33a' by the operating component 34 is the same as one of the first embodiment, it will not be repeated herein. The difference between the second embodiment and the first embodiment is described herein. In the second embodiment, when the seat body 20 is rotated to the forward-facing orientation, the locking component 31 can pass through the forward-facing installation hole 40 to move to the locked component 32, so as to lock with the locked component 32. When the seat body 20 in the forward-facing orientation is to be switched to the rearward-facing orientation, the locking component 31 and the locked component 32 can be unlocked, and then the locking component 31 passes back through the forward-facing installation hole 40 and passed out through the rearward-facing installation hole 50. At last, the locking component passing through the rearward-facing installation hole 50 is moved to the locked component 32, so as to lock with the locked component 32.

In contrast to the prior art, the seat fastening device of the present application includes the locking component, the locked component and the tightening and loosening mechanism configured to loosen or tighten the locking component. The locked component is installed on one of the seat body and the base, and the tightening and loosening mechanism installed on the other of the seat body and the base and connected to the locking component. The tightening and loosening mechanism is configured to loosen or tighten the locking component as the seat body is rotated to the forward-facing orientation or the rearward-facing orientation, so as to lock the locking component with the locked component, which achieves firm connection of the base and the seat body and convenient and rapid operation.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A seat fastening device adapted to a child safety seat, the child safety seat comprising a base and a seat body pivoted to the base via a pivotal shaft, so as to switch the seat body between a forward-facing orientation and a rearward-facing orientation by rotating around the pivotal shaft, the seat fastening device comprising:
   at least one locking component;
   a locked component assembled with one of the seat body and the base; and
   a tightening and loosening mechanism disposed inside the other of the seat body and the base and connected to the at least one locking component, the tightening and loosening mechanism being configured to loosen or tighten the at least one locking component when the seat body is in the forward-facing orientation or the rearward-facing orientation, so as to lock the at least one locking component with the locked component, and the tightening and loosening mechanism comprising a retractor;
   wherein the seat fastening device further comprises an operating component, a driving component for driving the retractor, and a drawing component, one end of the drawing component is connected to the operating component, another end of the drawing component is connected to the driving component, the driving component is linked with the operating component, the operating component is located on two lateral surfaces of the other of the seat body and the base where the tightening and loosening mechanism is disposed inside, and the driving component is disposed inside the other of the seat body and the base where the tightening and loosening mechanism is disposed inside;
   wherein the at least one locking component is exposed outside the other of the seat body and the base where the tightening and loosening mechanism is disposed inside;
   wherein the tightening and loosening mechanism further comprises at least one tightening and loosening component, the retractor is for retracting the at least one tightening and loosening component, and a free end of the at least one tightening and loosening component is connected to the at least one locking component.

2. The seat fastening device of claim 1, wherein the drawing component is a steel wire.

3. The seat fastening device of claim 1, wherein the at least one tightening and loosening component is a tape.

4. The seat fastening device of claim 1, wherein the at least one locking component is located on a front side or/and a back side of the other of the seat body and the base where the tightening and loosening mechanism is disposed inside, and the locked component is located on a front side or/and a back side of the seat body or the base.

5. The seat fastening device of claim 4, wherein the at least one tightening and loosening component comprises a front tightening and loosening component and a rear tightening and loosening component, the at least one locking component comprises two locking components, an end of the front tightening and loosening component and an end of the rear tightening and loosening component are connected to the retractor, another end of the front tightening and loosening component extends towards the locking component at a front side to form a front free end connected to the locking component at the front side, and another end of the rear tightening and loosening component extends towards the locking component at a back side to form a rear free end connected to the locking component at the back side.

6. The seat fastening device of claim 4, wherein a forward-facing installation hole and a rearward-facing installation hole are formed on the other of the seat body and the base where the tightening and loosening mechanism is disposed inside, one end of the at least one tightening and loosening component is connected to the retractor, another end of the at least one tightening and loosening component forms a free end, the least one locking component passes through the forward-facing installation hole to lock with the locked component as the seat body is rotated to the forward-facing orientation, and the least one locking component passes through the rearward-facing installation hole to lock with the locked component as the seat body is rotated to the rearward-facing orientation.

7. The seat fastening device of claim 1, wherein one of the at least one locking component and the locked component is a hook, and the other of the at least one locking component and the locked component is a rod.

8. A child safety seat comprising:
   a base;
   a seat body pivoted to the base via a pivotal shaft, so as to switch the seat body between a forward-facing orientation and a rearward-facing orientation by rotating around the pivotal shaft; and
   a seat fastening device comprising:
      at least one locking component;
      a locked component assembled with one of the seat body and the base; and
      a tightening and loosening mechanism disposed inside the other of the seat body and the base and connected to the at least one locking component, the tightening and loosening mechanism being configured to loosen or tighten the at least one locking component when the seat body is in the forward-facing orientation or the rearward-facing orientation, so as to lock the at least one locking component with the locked component, and the tightening and loosening mechanism comprising a retractor, wherein the seat fastening device further comprises an operating component, a driving component for driving the retractor, and a drawing component, one end of the drawing component is connected to the operating component, another end of the drawing component is connected to the driving component, the driving component is linked with the operating component, the operating component is located on two lateral surfaces of the other of the seat body and the base where the tightening and loosening mechanism is disposed inside, the driving component is disposed inside the other of the seat body and the base where the tightening and loosening mechanism is disposed inside, the at least one locking component is exposed outside the other of the seat body and the base where the tightening and loosening mechanism is disposed inside, the tightening and loosening mechanism further comprises at least one tightening and loosening component, the retractor is for retracting the at least one tightening and loosening component, and a free end of the at least one tightening and loosening component is connected to the at least one locking component.

9. The child safety seat of claim 8, further comprising a door-shaped bracket upwardly protruding from a rear end of the base, and the locked component is disposed in an enclosed space enclosed by the door-shaped bracket and the base.

10. The child safety seat of claim 8, wherein a safety belt passage is formed on the base for allowing a safety belt to pass through so as to restrain the base.

11. The child safety seat of claim 10, wherein the safety belt passage is a groove structure formed on a rear top portion of the base.

12. The child safety seat of claim 10, wherein the safety belt passage stretches across the base.

* * * * *